(12) United States Patent
Stonger et al.

(10) Patent No.: US 7,026,621 B2
(45) Date of Patent: Apr. 11, 2006

(54) SYSTEM AND METHOD FOR PRODUCING A DETECTOR POSITION MAP

(75) Inventors: Kelly Alan Stonger, Waukesha, WI (US); John Jay Williams, Hartland, WI (US)

(73) Assignee: GE Medical Systems Global Technology Co., LLC, Waukesha, WI (US)

( * ) Notice: Subject to any disclaimer, the term of this patent is extended or adjusted under 35 U.S.C. 154(b) by 217 days.

(21) Appl. No.: 10/668,167

(22) Filed: Sep. 24, 2003

(65) Prior Publication Data

US 2005/0061983 A1 Mar. 24, 2005

(51) Int. Cl.
*G01T 1/164* (2006.01)

(52) U.S. Cl. .................. 250/363.03; 250/369

(58) Field of Classification Search ........... 250/363.02, 250/363.03, 363.07, 363.09, 366, 369, 363.01, 250/370.01, 370.09, 252.1
See application file for complete search history.

(56) References Cited

U.S. PATENT DOCUMENTS

| | | | |
|---|---|---|---|
| 5,272,343 A | | 12/1993 | Stearns |
| 5,354,991 A | * | 10/1994 | Odell .......................... 250/369 |
| 5,986,279 A | * | 11/1999 | Dewaele ..................... 250/582 |
| 6,087,663 A | * | 7/2000 | Moisan et al. ............... 250/367 |
| 6,194,726 B1 | * | 2/2001 | Pi et al. ..................... 250/363.1 |
| 6,297,506 B1 | * | 10/2001 | Young et al. ................ 250/369 |
| 6,319,682 B1 | * | 11/2001 | Hochman ..................... 435/29 |
| 6,362,479 B1 | * | 3/2002 | Andreaco et al. ........... 250/366 |
| 6,403,961 B1 | * | 6/2002 | Stark ..................... 250/363.09 |
| 6,605,809 B1 | * | 8/2003 | Engels et al. ............... 250/394 |

OTHER PUBLICATIONS

M. Dahlbom and E.J. Hoffman, "An Evaluation of a Two-Dimensional Array Detector for High Resolution PET," IEEE Transactions on Medical Imaging, vol. 7, No. 4, pp. 264-271 (1988).

(Continued)

*Primary Examiner*—David Porta
*Assistant Examiner*—Faye Polyzos
(74) *Attorney, Agent, or Firm*—Hunton & Williams LLP

(57) ABSTRACT

The invention relates to a system and method for generating a detector position map for an array of detectors. The detector position map comprises a map which converts measured position coordinates from a detection event to the detector in the array which detected the detection event. The method comprises the steps of illuminating an array of detectors with a source of radiation to generate a histogram, the histogram comprising an event count as a function of two dimensions, the two dimensions corresponding to a face of the array of detectors, wherein the histogram comprises a plurality of first peaks; modifying the histogram to comprise a plurality of second peaks, wherein the second peaks have a greater degree of isolation from each other than the first peaks; and for each detector, determining a region on the detector position map which corresponds to the detector, each region being based on a position of one of the second peaks.

17 Claims, 8 Drawing Sheets

OTHER PUBLICATIONS

Joel G. Rogers et al., "Testing 144- and 256-crystal BGO Block Detectors," IEEE Transactions on Nuclear Science, vol. 41, No. 4, pp. 1423-1429 (1994).

RA Mintzer, et al., "Maximum-Likelihood Calibration of Small Gamma Cameras for 511 keV Positron Annihilation Radiation," 1995 IEEE Nuclear Science Symposium and Medical Imaging Conference Record, vol. 3, pp. 1567-1570 (1995).

W.W. Moses et al., "Performance of a PET Detector Module Utilizing an Array of Silicon Photodiodes to Identify the Crystal of Interaction," IEEE Transactions on Nuclear Science, vol. 40, No. 4, pp. 1036-1040 (1993).

Robert M. Gray et al., "Maximum a Posteriori Estimation of Position in Scintillating Cameras," IEEE Transactions on Nuclear Science, vol. NS-23, No. 1, pp. 849-852 (1976).

T.D. Milster, et al., "Digital Position Estimation for the Modular Scintillation Camera," IEEE Transactions on Nuclear Science, vol. NS-32, No. 1, pp. 748-752 (1985).

M.E. Casey and R. Nutt, "A Multicrystal Two Dimensional BGO Detector System for Positron Emission Tomography," IEEE Transactions on Nuclear Science, vol. 33, No. 1, pp. 460-463 (1986).

Neal H. Clinthorne, et al. "A Hybrid Maximum Likelihood Position Computer for Scintillation Cameras," IEEE Transaction on Nuclear Science, vol. NS-34, No. 1, pp. 97-101 (1987).

John W. Young, et al., "FPGA Based Front-End Electronics for a High Resolution PET Scanner," IEEE Transactions on Nuclear Science, vol. 47, No. 4, pp. 1676-1680 (2000).

* cited by examiner

SYSTEM AND METHOD FOR PRODUCING A DETECTOR POSITION MAP

BACKGROUND OF THE INVENTION

The present invention relates generally to an imaging device, and more particularly to a system and method for mapping a detected radiation event to a particular detector in a medical imaging device such as a positron emission tomography scanner.

A positron emission tomography (PET) scanner detects gamma rays which emanate from the patient. In a PET scan, the patient is initially injected with a radiopharmaceutical, which is a radioactive substance such as FDG ([$^{18}$F] fluorodeoxyglucose) which emits positrons as it decays. Once injected, the radiopharmaceutical becomes involved in certain known bodily processes such as glucose metabolism or protein synthesis, for example. The emitted positrons travel a very short distance before they encounter an electron, at which point an annihilation event occurs whereby the electron and positron are annihilated and converted into two gamma rays. Each of the gamma ray has an energy of 511 keV, and the two gamma rays are directed in nearly opposite directions. The two gamma rays are detected essentially simultaneously by two of the detector crystals (also commonly referred to as "scintillators" or "scintillator crystals") in the PET scanner, which are arranged in rings around the patient bore. The simultaneous detection of the two gamma rays by the two detector crystals is known as a "coincidence event." The millions of coincidence events which are detected and recorded during a PET scan are used to determine where the annihilation events occurred and to thereby reconstruct an image of the patient.

One of the challenges in designing a high resolution PET scanner relates to the space requirements of the electronics associated with the detector crystals, in particular the photomultiplier tubes (PMTs) which are situated behind the detector crystals. The function of the photomultiplier tubes is to receive photons produced by the scintillator crystals and to generate an analog signal with a magnitude representative of the number of photons received. The photomultiplier tubes typically cannot be diminished in size beyond a certain point, so that generally each photomultiplier tube is situated behind a number of smaller detector crystals. For example, a detector module in a PET scanner may comprise a 2×2 array of photomultiplier tubes situated behind a 6×6 array of scintillator crystals. The photons generated by a detector crystal generally spread out to a certain extent and travel into adjacent detector crystals such that each of the four photomultiplier tubes typically receives a certain number of photons as a result of a gamma ray hitting a single detector crystal.

In response to a scintillation event, each PMT produces an analog signal which rises sharply when a scintillation event occurs then tails off exponentially. The relative magnitudes of these analog signals are used to calculate a coordinate pair (x, z) which indicates the position at which the gamma ray was incident on the crystal detector array. The (x, z) coordinate pair is mapped to a specific detector crystal in the detector array using a look-up table. The data in the look-up table may be referred to as a detector position map. For each pair of coordinates (x, z), the detector position map maps that pair of coordinates to one of the detectors in the array of detectors.

With ideal hardware, the detector position map would simply be a rectangular grid corresponding to the geometry of the detector crystals, where each detector crystal would have an equal area on the grid. However, this simple mapping scheme is generally not accurate due to non-linearity in the analog parts of the detector and manufacturing differences between detector crystals. For example, if a simple rectangular grid were used as the detector position map, a certain percentage of (x, z) coordinate pairs would be mapped to the wrong detector crystal.

The present invention provides a system and method for producing a detector position map which accurately maps the detected coordinates (x, z) to the correct detector crystal.

SUMMARY

According to one embodiment, the invention relates to a method of generating a detector position map for an array of detectors. The detector position map comprises a map which maps measured coordinates from a detection event to the detector in the array which detected the detection event. The method comprises the steps of illuminating an array of detectors with a source of radiation to generate a histogram, the histogram comprising an event count as a function of two dimensions, the two dimensions corresponding to a face of the array of detectors, wherein the histogram comprises a plurality of first peaks; modifying the histogram to comprise a plurality of second peaks, wherein the second peaks have a greater degree of isolation from each other than the first peaks; and for each detector, determining a region on the detector position map which corresponds to the detector, each region being based on a position of one of the second peaks.

According to another embodiment, the invention relates to a system for generating a detector position map for an array of detectors. The detector position map comprises a map which maps measured coordinates from a detection event to the detector in the array which detected the detection event. The system comprises a memory; and a processor which receives a plurality of event data packets, each event data packet comprising a coordinate pair; stores the plurality of event data packets in the form of a histogram in the memory, the histogram comprising an event count as a function of two dimensions, the two dimensions corresponding to a face of the array of detectors, wherein the histogram comprises a plurality of first peaks; modifies the histogram to comprise a plurality of second peaks, wherein the second peaks have a greater degree of isolation from each other than the first peaks; for each detector, determines a region on the detector position map which corresponds to the detector, each region being based on a position of one of the second peaks; and stores each region in the memory to create the detector position map.

BRIEF DESCRIPTION OF THE DRAWINGS

FIG. 7 is an example of a 3×3 low pass filter kernel;

FIG. 8 depicts two examples of 3×3 Laplacian filter kernels;

FIG. 9 is an example of a 9×9 Laplacian filter kernel;

DETAILED DESCRIPTION

The operation of a PET scanner will be described, followed by a description of the generation of the detector position map used by the scanner to map events to a particular detector in the array.

Figure 1:
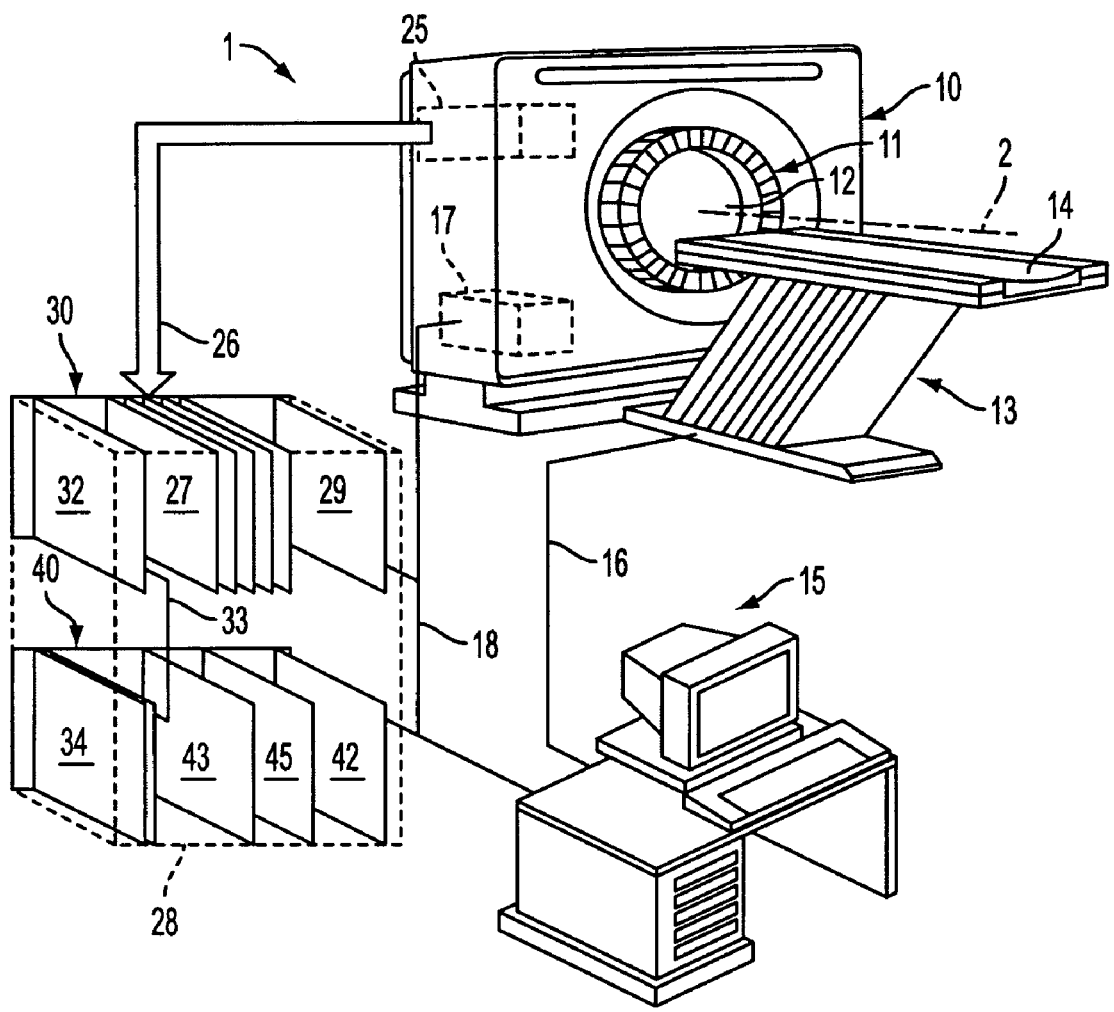
FIG. 1 is a drawing of an imaging system according an exemplary embodiment of the invention.

FIG. 1 illustrates an example of a PET scanner 1 which includes a gantry 10 supporting a detector ring assembly 11 about a central opening or bore 12. The detector ring assembly 11 is circular in shape and is made up of multiple detector rings (not shown) that are spaced along a central axis 2 to form a cylindrical detector ring assembly. According to one embodiment, the detector ring assembly 11 includes 24 detector rings spaced along the central axis 2. A patient table 13 is positioned in front of the gantry 10 and is aligned with the central axis 2 of the detector ring assembly 11. A patient table controller (not shown) moves the table bed 14 into the bore 12 in response to commands received from an operator work station 15 through a serial communications link 16. A gantry controller 17 is mounted within the gantry 10 and is responsive to commands received from the operator work station 15 through a second serial communication link 18 to operate the gantry.

Figure 2:
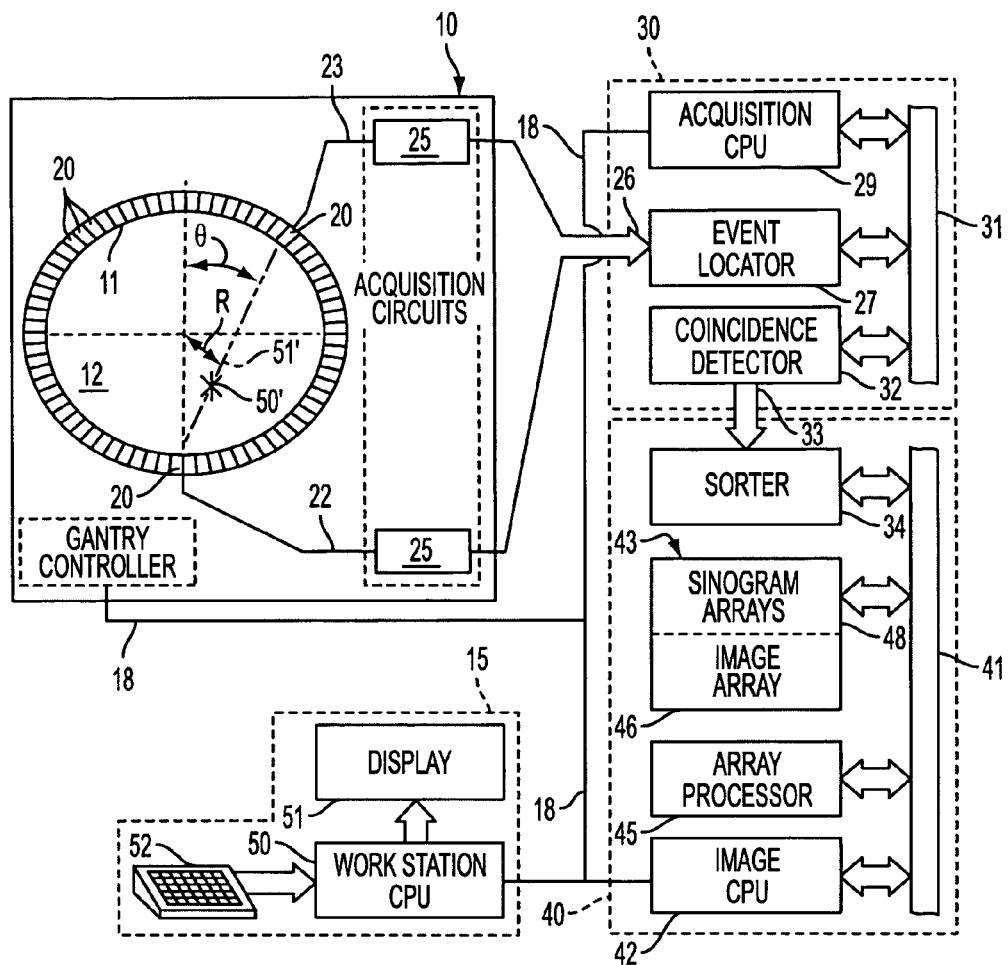
FIG. 2 is a schematic diagram of the imaging system of FIG. 1.

As shown in FIG. 2, the operator work station 15 includes a central processing unit (CPU) 50, a display 51 and a keyboard 52. Through the keyboard 52 and associated control panel switches, the operator can control the calibration of the PET scanner, its configuration, and the positioning of the patient table for a scan. Similarly, the operator can control the display of the resulting image on the display 51 and perform image enhancement functions using programs executed by the work station CPU 50.

Figure 3:
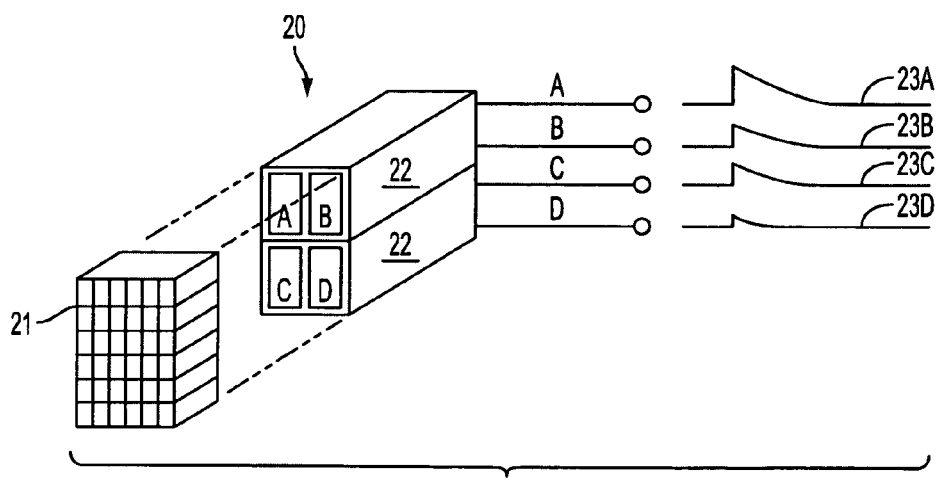
FIG. 3 is a drawing of a detector module which forms part of the imaging system of FIG. 1.

Each detector ring of the detector ring assembly 11 is comprised of a number of detector modules 20. According to one embodiment, each detector ring includes 72 detector modules 20. Each detector module 20 comprises a number of individual detector crystals. As shown in FIG. 3, each detector module 20 may comprise a 6×6 matrix of 36 detector crystals 21. FIG. 3 shows an arrangement of a 6×6 array of detector crystals 21 which are situated in front of four photomultiplier tubes (PMTs) 22.

During a PET scan, a gamma ray is incident upon one of the detector crystals 21. The detector crystal 21, which may be formed of bismuth germanate (BGO), for example, converts the gamma ray into a number of photons which are received and detected by the photomultiplier tubes. The photons generated by a detector crystal 21 generally spread out to a certain extent and travel into adjacent detector crystals such that each of the four-photomultiplier tubes 22 receives a certain number of photons as a result of a gamma ray hitting a single detector crystal 21.

In response to a scintillation event, each PMT 22 produces an analog signal 23A–23D on one of the lines A–D shown in FIG. 3 which rises sharply when a scintillation event occurs then tails off exponentially. The relative magnitudes of the analog signals are determined by the position in the 6×6 detector crystal matrix at which the scintillation event took place. The energy of the gamma ray which caused the scintillation event determines the total magnitude of these four signals.

As shown in FIG. 2, a set of acquisition circuits 25 is mounted within the gantry 10 to receive the four signals from each of the detector modules 20 in the detector ring. The acquisition circuits 25 determine the event coordinates within the block of detector crystals 21 by comparing the relative signal strengths as follows:

$$x=(A+C)/(A+B+C+D)$$

$$z=(A+B)/(A+B+C+D)$$

These coordinates (x, z), along with the sum of all four signals (A+B+C+D) are then digitized and sent through a cable 26 to an event locater circuit 27 which may be housed in a separate cabinet 28. Each acquisition circuit 25 also produces an event detection pulse (EDP) which indicates the exact moment the scintillation event took place. Of course, the above-described configuration of detector crystals and modules is merely an example. Other configurations, sizes, and numbers of detector crystals and detector modules can be used, as will be appreciated by those skilled in the art.

Figure 15:
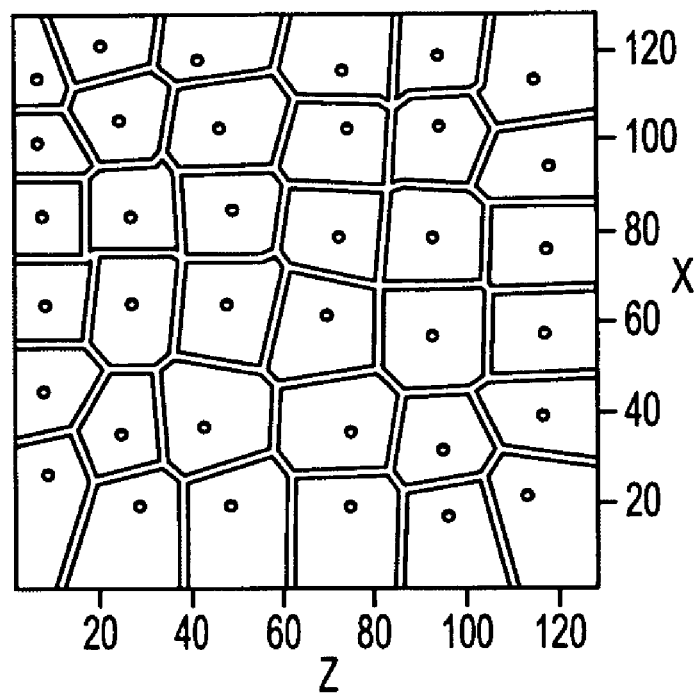
FIG. 15 is a detector position map generated from the peak apex pixel locations shown in FIG. 13.

The event locator circuits 27 form part of a data acquisition processor 30 which periodically samples the signals produced by the acquisition circuits 25. The data acquisition processor 30 has an acquisition CPU 29 which controls communications on the local area network 18 and a bus 31. The event locator circuits 27 assemble the information regarding each valid event into a set of digital numbers that indicate precisely when the event took place and the identity of the detector crystal 21 which detected the event. The event locator circuits 27 use a detector position map to map the coordinate pair (x, z) to the detector crystal which detected the event. The detector position map is a two dimensional look-up table that maps a singles event (x, z) coordinate position to a detector ID number. An example of a detector position map is shown in FIG. 15.

The event data packets are transmitted to a coincidence detector 32 which is also part of the data acquisition processor 30. The coincidence detector 32 accepts the event data packets from the event locator circuits 27 and determines if any two of them are in coincidence. Coincidence is determined by a number of factors. First, the time markers in each event data packet must be within a specified time period of each other, e.g., 12.5 nanoseconds, and second, the locations indicated by the two event data packets must lie on a straight line which passes through the field of view (FOV) in the scanner bore 12. Events which cannot be paired are discarded, but coincident event pairs are located and recorded as a coincidence data packet that is transmitted through a serial link 33 to a sorter 34. The format of the coincidence data packet may be, for example, a thirty-two bit data stream which includes, among other things, a pair of digital numbers that precisely identify the locations of the two detector crystals 21 that detected the event. For a detailed description of an example of a coincidence detector 32, reference is made to U.S. Pat. No. 5,241,181 entitled "Coincidence Detector For A PET Scanner."

The sorter 34, which may comprise a CPU and which forms part of an image reconstruction processor 40, receives the coincidence data packets from the coincidence detector 32. The function of the sorter 34 is to receive the coincidence data packets and generate from them memory addresses for the efficient storage of the coincidence data. The set of all projection rays that point in the same direction (θ) and pass through the scanner's field of view is a complete projection, or "view." The distance (R) between a particular projection ray and the center of the field of view locates that projection ray within the view. As shown in FIG. 2, for example, an event 50' occurs along a projection ray 51' which is located in a view at the projection angle θ and the distance R. The sorter 34 counts all of the events that occur on this projection ray (R, θ) during the scan by sorting out the coincidence data packets that indicate an event at the two detector crystals 21 lying on this projection ray. During an emission scan, the coincidence counts are organized in memory 43, for example as a set of two-dimensional arrays, one for each axial image, and each having as one of its dimensions the projection angle θ and the other dimension the distance R. This θ by R map of the measured events may be referred to as a sinogram array 48. The sorter 34 may also organize the coincidence events into other data formats, such as the projection plane format described in U.S. Pat. No. 6,462,342. In the projection plane format, additional variables are used to define coincidence events which are detected by pairs of detector crystals in non-adjacent detector rings.

Coincidence events occur at random and the sorter 34 determines the θ and R values from the two crystal addresses in each coincidence data packet and increments the count of the corresponding sinogram array element. At the completion of the emission scan, the sinogram array 48 stores the total number of annihilation events which occurred along each ray. The array processor 45 reconstructs an image from the data in the sinogram array 48. First, however, a number of corrections are made to the acquired data to correct for measurement errors such as those caused by attenuation of the gamma rays by the patient, detector gain nonuniformities, random coincidences, and integrator deadtime. Each row of the corrected sinogram array is then Fourier transformed by the array processor 45 and multiplied by a one-dimensional filter array. The filtered data is then inverse Fourier transformed, and each array element is back-projected to form the image array 46. The image CPU 42 may either store the image array data on disk or tape (not shown) or output it to the operator work station 15.

Figure 6:
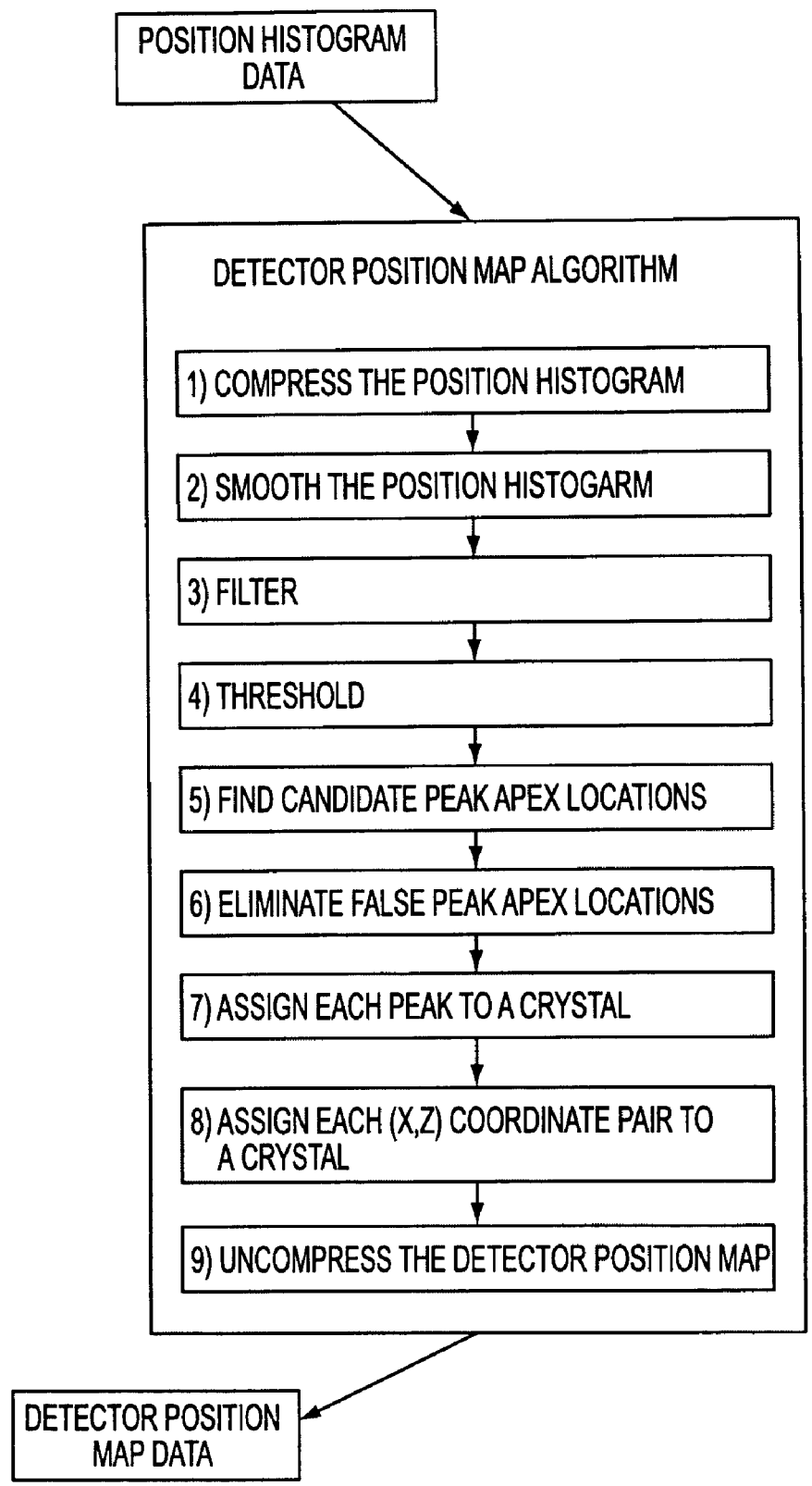
FIG. 6 is a flow chart showing steps in an example of a method for generating a detector position map.

An example of a method for generating a detector position map which is used to map the coordinate pairs (x, z) to the detector crystal which detected the event will now be described. The method can be carried out with the system shown in FIG. 2. For example, the acquisition CPU 29 can be used to perform the processing steps in the exemplary method. The position histogram can be created with the event locator circuits 27, and the resulting detector position map can be loaded into the event locator circuits 27. FIG. 6 is a flow chart showing the steps for generating a detector position map using a position histogram as input data to produce the detector position map as output data according to an exemplary embodiment of the invention. The steps in the method will be explained in detail in the following discussion.

Initially, the acquisition hardware of the PET scanner is configured to create a position histogram. The position histogram is created by illuminating the detector array with a spatially uniform gamma ray flux. The position histogram is a histogram of the (x, z) coordinate positions of each singles event which occurs during the illumination with the uniform gamma ray flux. The position histogram is ultimately converted into a detector position map.

Figure 4:
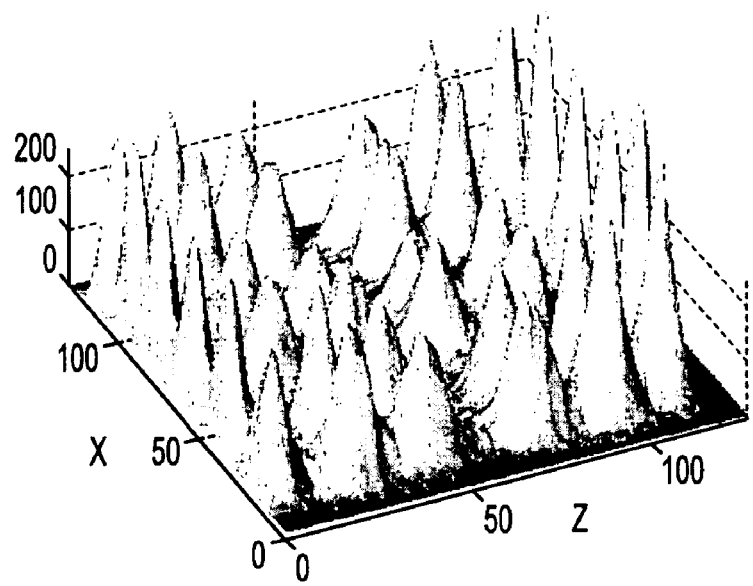
FIG. 4 is a 3D image of a compressed position histogram according to an exemplary embodiment of the invention.

The form of a typical position histogram viewed as a 3D image is shown in FIG. 4, with the vertical axis indicating the number of singles events that mapped to each (x, z) location during the illumination with the uniform gamma ray flux. The histogram shown in FIG. 4 is a compressed version of the raw histogram data. In general, each detector crystal produces a footprint in the position histogram that appears as a mountain peak. As shown in FIG. 4, there can be a wide variance in both peak height and the valley heights between the peaks. The detector that produced FIG. 4 comprised a 6×6 matrix of crystals, giving 36 major peaks. The methods described herein, however, are not limited to this geometry.

Figure 5:
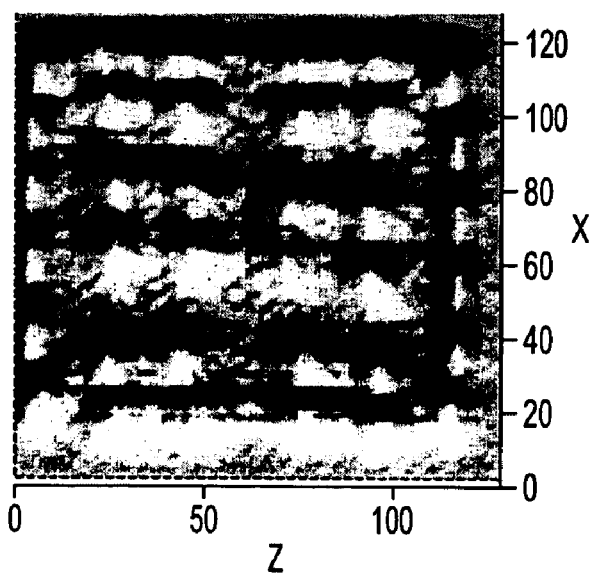
FIG. 5 is a top view of the compressed position histogram of FIG. 4.

After the position histogram data have been generated, optionally the data can be compressed, if desired, to reduce processing time. This step may be advantageous if the nominal size of the position histogram is relatively large. As an example, if the size of the position histogram is 256×256, it can be compressed to a 128×128 compressed histogram by summing four adjacent pixels in the 256×256 histogram to produce one pixel in the 128×128 compressed histogram. The compression operation will also have a smoothing effect on the data. FIG. 4 is a 128×128 histogram which was derived by compressing a 256×256 position histogram. FIG. 5 is the same image, but viewed from the top looking down. The following discussion assumes that the nominal histogram size is 256×256 and that it has been compressed to 128×128 for processing.

Figures 7, 8, 9:
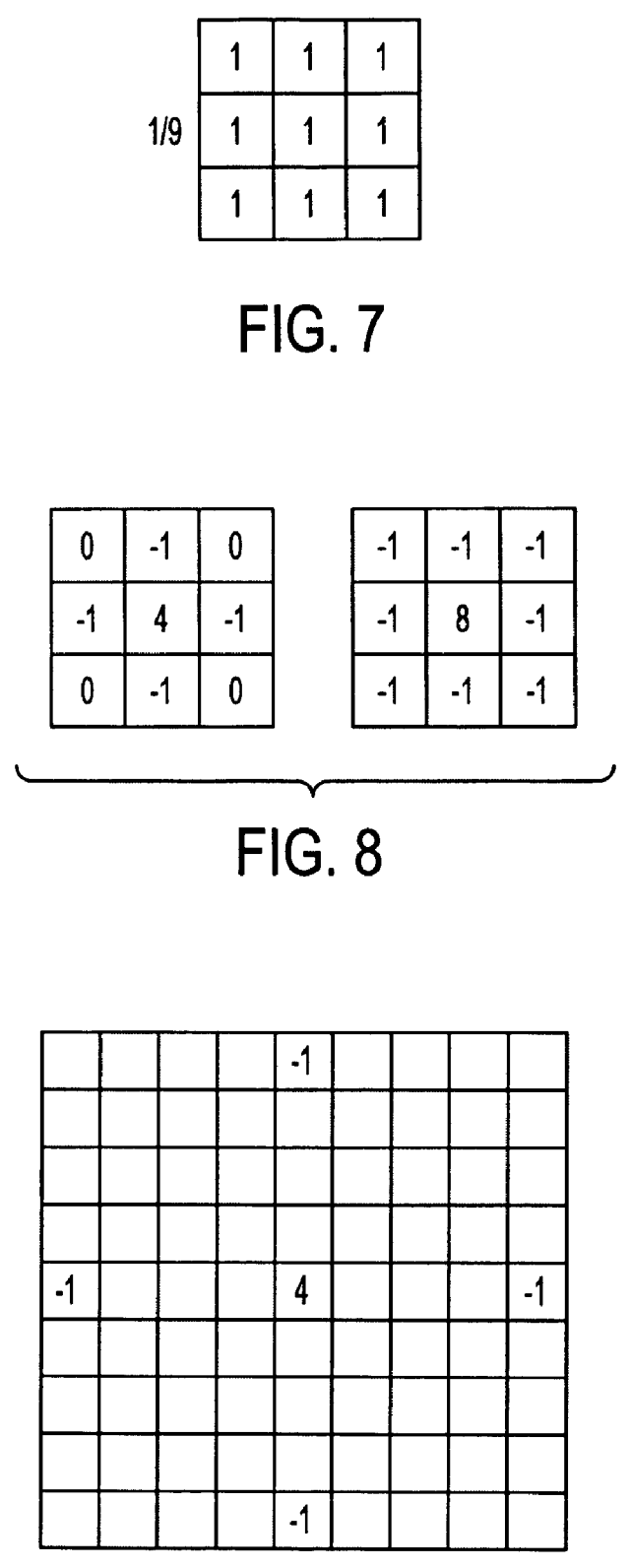

A typical position histogram may contain a significant amount of noise that may advantageously be reduced with a low pass filter. For example, the compressed position histogram shown in FIG. 4 may be smoothed to reduce noise by a convolution with a low pass filter. An example of a suitable low pass filter is shown in FIG. 7. As is well known in the art, convolution is carried out by placing the filter on the histogram, multiplying each value in the low pass filter with the corresponding (overlapping) pixel value in the histogram, adding the products together to get a sum, and replacing the cell of the histogram corresponding to the center pixel of the low pass filter with the sum of the products. The low pass filter is then moved to the next pixel on the histogram and the process is repeated. After the low pass filter has been applied to each pixel in the compressed position histogram, the resulting data, which may be referred to as a smoothed histogram, is smoothed with respect to the compressed position histogram.

In the next step of the exemplary method, the data of the smoothed histogram is convolved with a Laplacian filter. The Laplacian filter can be used to separate the histogram peaks from the valleys. A Laplacian filter calculates the second derivative, which is the curvature of the image over the area of the filter kernel. Examples of 3×3 Laplacian filters are illustrated in FIG. 8. An example of a 9×9 Laplacian filter is shown in FIG. 9. In the 9×9 Laplacian filter of FIG. 9, the empty cells have a value of zero. Convolution of the smoothed histogram with the Laplacian filter is carried out in the same way as described above with respect to the low pass filter.

Figure 10:
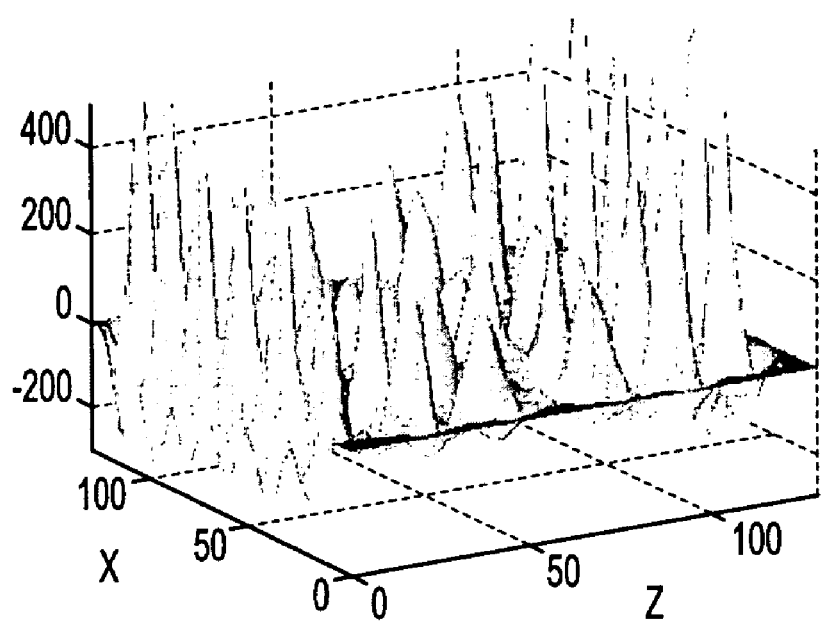
FIG. 10 is a 3D image of a histogram which has been convolved with a Laplacian filter.

FIG. 10 shows the result of a Laplacian convolution of the smoothed histogram from the previous step. From FIG. 10 it can be seen that the Laplacian filter transforms the histogram valleys into negative peaks, while retaining the general form and location of the histogram peaks. This operation results in a more defined separation between the histogram peaks that are close together.

Figure 11:
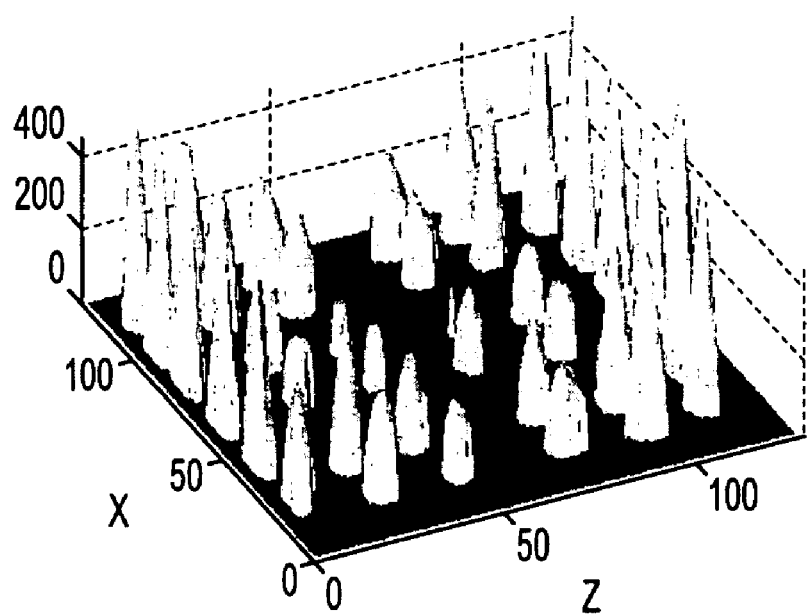
FIG. 11 is an image of the histogram of FIG. 10 after a threshold operation has been performed.
Figure 12:
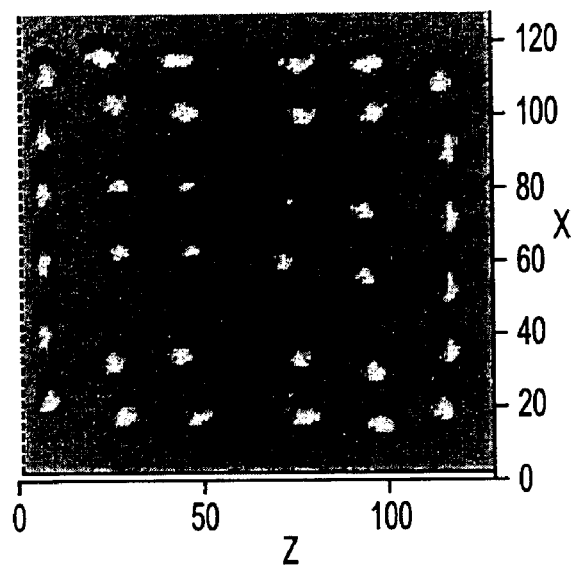
FIG. 12 is a top view of the histogram of FIG. 11.

The next step in the exemplary method comprises a threshold determination. This step can remove noise from the Laplacian filter output. In this step, each pixel in the Laplacian histogram is examined to determine whether it is less than a specified threshold value. If the pixel value is less than the threshold value, then the pixel value is set to zero. The threshold value, according to one embodiment, is a positive number on the order of 100. FIG. 11 illustrates the output from this step using a threshold value of 125. The output histogram may be referred to as a thresholded histogram. FIG. 12 is a top view of FIG. 11. A comparison of FIG. 12 with the image in FIG. 5 illustrates the separation of peaks and the reduction of noise in the thresholded histogram.

According to one embodiment, the threshold value is selected based on the total number of counts in the uncompressed position histogram using the empirical formula:

Threshold=0.00013158*TotalCount

Where TotalCount is sum of each pixel value in the position histogram. A large threshold value will give better isolation of peaks and reduce the amount of data for the remaining steps. However, since there may be a wide variance in peak height, too large a threshold value can eliminate valid peaks.

After the thresholded histogram has been generated, the next step of the exemplary method involves producing a list of peak apex candidate locations. The term "peak apex" refers to the highest point on a peak. This step involves examining each pixel in the thresholded histogram to determine whether it is a peak apex. The following pseudo code illustrates the process:

For each pixel in the thresholded histogram, do the following:

```
if the pixel is zero,
    skip the pixel, since its not contained within a peak.
else
    Look at the eight surrounding pixels. If the value of the
    pixel is greater than its eight neighbors,
    Then save it as a peak apex candidate.
The output of this step is a list of peak apex candidate locations.
```

Preferably, the number of peak apex candidates from the thresholding step would equal the number of detector crystals in the detector array. If the number of peak apex candidates is the same as the number of detector crystals, the next step, eliminating false peaks, is not necessary. If there are fewer peak apex candidates than detector crystals in the array, then the threshold value may be too large. The threshold value can be reduced such that the thresholded histogram contains at least as many peak apex candidates as the number of detectors in the array.

If there are more peak apex candidates than detector crystals, then false peak apex candidates can be eliminated by searching the list of peak apex candidates for the two closest pairs and eliminating the candidate with the smaller value. This process assumes that two peak apex candidates that are close together are part of the same peak. The process can be continued until the number of peak apex candidates equals the number of detectors in the array. The following pseudo code describes the method:

Do the following until the number of candidates equals the number of crystals:
  Search the list of peak apex candidates for the two closest pairs using Euclidean distance as the metric.
  Eliminate the candidate with the smallest pixel value.

Figure 13:
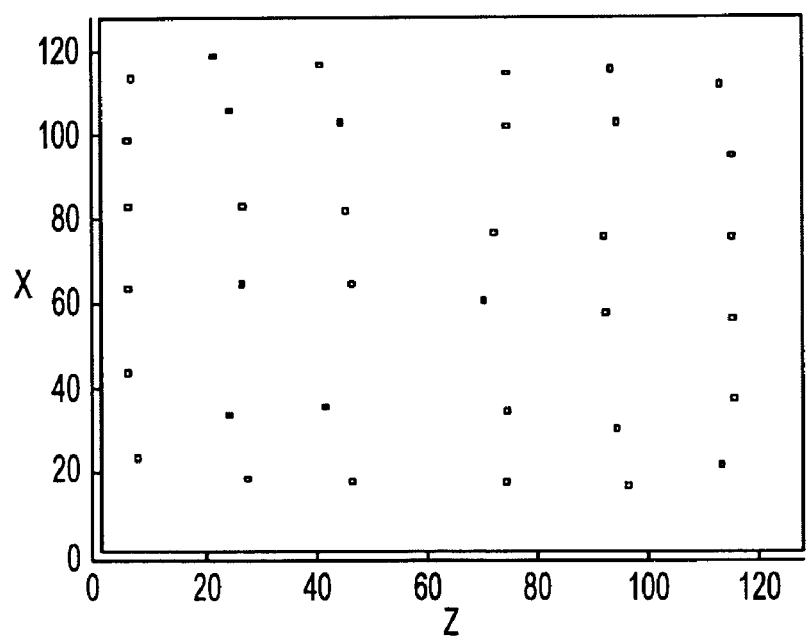
FIG. 13 is a map of the peak apex pixel locations of the peaks of FIG. 12.

FIG. 13 is a resulting image of the peak apex pixels that correspond to the position histogram in FIG. 4.

Another method can be implemented to determine the peak apex pixels, according to an exemplary embodiment of the invention. This feature involves converting the peak apex candidates to decimal numbers. After the peak apex candidates have been converted to decimals, a centroid is calculated for a desired peak neighborhood. The neighborhood can be defined, for example, as the region within a certain distance of the peak apex pixel, e.g., all pixels within a 10-pixel radius of the peak apex pixel. The centroid is analogous to a center of mass, assuming that the height of the pixels represents a mass. By calculating the centroid for a desired peak neighborhood, false peaks that are close to the centroid peak can be eliminated.

As is evident from FIGS. 11 and 12, the original position histogram has been modified in such a way as to enhance the isolation of its peaks. FIG. 12 shows, for example, that the peaks have been isolated. The Laplacian can provide the advantage of accentuating the separation between peaks by, for example, forcing the valleys between the peaks to be zero, after thresholding. The average cross section of the peaks of the original position histogram has also been reduced. This modification of the peaks facilitates the subsequent determination of the peak apex pixels.

Figure 14:
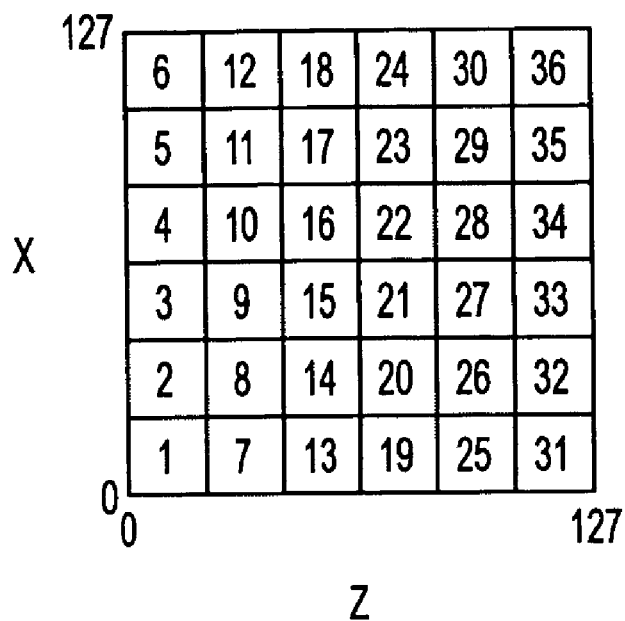
FIG. 14 is an example of a numbering scheme for a 6×6 detector array.

After the peak apex pixels have been identified, the next step involves assigning each peak apex to a detector crystal. FIG. 14 depicts an example of a detector crystal numbering scheme. Each peak apex pixel identified in the previous step is assigned one of the detector crystal identification numbers (1–36) shown in FIG. 14. The result of this step is a 2D array, where each cell in the array corresponds to a cell in FIG. 14 and contains the (x, z) coordinates for the peak apex pixel and the ID number (e.g., 1–36) of the corresponding detector crystal. This array may be referred to, for example, as the CrystalPeaks array.

Initially, the (x, z) coordinates for each peak apex pixel are stored, for example, in a 1D array. Each entry in this 1D array includes an x coordinate and a z coordinate. This array may be referred to, for example, as the PeakApex array.

The detector ID numbers shown in FIG. 14 are then stored in the 2D CrystalPeaks array. For example, CrystalPeaks[0][0].Id is set to 1, CrystalPeaks[3][3].Id is set to 22, CrystalPeaks[5][5].Id is set to 36, etc. As will be appreciated by those skilled in the art, any other desired numbering format, e.g., hexadecimal, may be used for the detector ID numbers.

Next, each (x, z) coordinate pair contained in the ID PeakApex array is randomly stored in a cell of the 2D CrystalPeaks array.

The next step in the process comprises a sorting routine in two dimensions, x and z. A conventional bubble sort routine can be used. This method makes use of the realization that the peak apex locations (x, z) can be sorted based on location of both their x and z positions. For example, a peak apex assigned to crystal 1 will have a lesser x value than a peak apex assigned to crystal 2. Likewise, a peak apex assigned to crystal 1 have a lesser z value than a peak apex assigned to crystal 7. This sorting operation may be applied to sort the x data in the array into increasing order of the x coordinate. This sorting operation may then be applied to sort the z data in the array in increasing order of the z coordinate. In the resulting sorted array, the coordinate pairs (x, z) representing the peak apex pixels are assigned to the crystal ID numbers in the configuration shown in FIG. 14.

The following pseudo code illustrates an exemplary method of assigning each peak apex to a detector crystal. The pseudo code uses the following definitions:

"CrystalsInX" is the number of detector crystals in the x direction. In this example it is 6.

"CrystalsInZ" is the number of detector crystals in the Z direction. In this example it is 6.

"CrystalPeaks[x][z]" is a 2D array that will contain the location coordinates (x, z) and crystal ID number (e.g., 1–36) for crystal peak. The size of the array is CrystalsInX by CrystalsInZ. Each entry of the array has a location given by CrystalPeaks[x][z].X and by CrystalPeaks[x][z].Z and a crystal ID number given by CrystalPeaks[x][z].Id.

"PeakApex[i]" is a list of peak apex locations created in the previous step. Each entry has a location given by PeakApex[i].X and PeakApex[i].Z. The pseudo code is as follows:

```
First, mark all CrystalPeaks[x][z].Id entries to reflect the numbering in
FIG. 14. For example, CrystalPeaks[0][0].Id = 1,
CrystalPeaks[5][5].Id =36, etc. Next, randomly assign a peak location
from the PeakApex[I] array to a location in the CrystalPeaks[x][z] array.
notDone = TRUE;
While (notDone == TRUE)
begin
    notDone = FALSE;
    Sort the x data in the CrystaPeaks[x][z] array in increasing order. If
    anything was moved, set notDone = TRUE.
    Sort the z data in the CrystaPeaks[x][z] array in increasing order. If
    anything was moved, set notDone = TRUE.
end;
```

After each peak apex pixel has been associated with a detector crystal and assigned a crystal ID number, the remainder of the pixels in the detector position map are assigned a crystal ID number, based on their proximity to a peak apex pixel. Each pixel in the detector position map is assigned the crystal ID number of the closest peak apex, using Euclidean distance as the metric.

For each pixel in the detector position map, the process of determining which peak apex is closest involves calculating a distance indication between the pixel in question and each peak apex pixel. The distance calculation is carried out by calculating the sum of the squares of the change in x and the change in z between the pixel in question and each peak apex pixel. To calculate the distance, the square root of the sum of the squares of the change in x and the change in y can be calculated. However, the square root step can be omitted, if desired, because the objective is simply to find the smallest magnitude.

An efficiency check can be included, if desired, to skip the step of calculating distances if the change in x and the change in z are greater than a predetermined distance relative to the detection position map, e.g., greater than ⅓ the total detector position map dimension. In such case, the distance calculation can be skipped because it may be safely concluded that the peak apex pixel in question is not the closest one to the pixel in question.

The following pseudo code provides an example of the process for associating a peak apex pixel and crystal ID number to each pixel on the detector position map. The following definitions can be used for the pseudo code.

"Pixel" is the current detector position map pixel under consideration. It has a location given by pixel.X and pixel.Z and a value given by pixel.Value.

"CrystalPeaks[x][z]" has the same definition as in the previous x, z sorting step.

"SizeInX" number of pixels in the x coordinate (128 in this example).

"SizeInZ" number of pixels in the z coordinate (128 in this example).

```
1   For each pixel in the detector position map do:
2   begin
3       bestDistance = 2 * sizeInX * sizeInX         // set a long best
                                                         distance
4       bestId = 0                                    // set an unused
                                                         crystal id
5       For x = 0 to crystalsInX-1
6       begin
7           for z = 0 to crystalsInZ-1
8           begin
9               dx = abs( pixel.X – crystalPeaks[x][z].X)   // delta x
10              dz = abs( pixel.Z – crystalPeaks[x][z].Z)   // delta z
11              If (dx < sizeInX/3) and (dz < sizeInZ/3)    // Is the pixel close
                                                                to this
                                                                apex point?
12              begin                                        // yes
13                  distance = dx*dx + dz*dz                 // find the distance
                                                                squared
14                  If (distance < bestDistance)             // Is this distance
                                                                less than
                                                                the current best
                                                                distance?
15                  begin                                    // yes
16                      bestDistance = distance              // save as the
                                                                new best
                                                                distance
17                      bestId = crystalPeaks[x][z].Id       // save the new best
                                                                crystal id
18                  end
19              end
20          end                                              // z loop
21      end                                                  // x loop
22      If (bestId > 0)                                      // Was crystal
                                                                id was
                                                                found?
23      begin                                                // yes
24          pixel.Value = bestId                             // assign a crystal
                                                                id to
                                                                this pixel
25      else
26                                                           // error - all peaks
                                                                are too
                                                                far away
27      end
28  end                                                      // pixel loop
```

Line 11 in the pseudo code above tests to see if the current pixel is close enough to the current peak apex point to go through the expense of a distance check involving multiplication in line 13.

An example of a detector position map produced by this step is shown in FIG. 15. The lines in FIG. 15 represent the boundaries between different crystal ID codes. FIG. 15 also contains the peak apex pixel locations for reference.

If the position histogram was compressed initially, the detector position map created in the previous step can be restored to the uncompressed size. In this example, the detector position map coordinates are generated relative to a 128×128 size and they can be translated back to a 256×256 scale to produce the final detector position map. Pixel replication can be used to uncompress the data. If the peak location is found in floating point, interpolation can be performed at the crystal boundaries. Other methods can also be utilized, such as median filtering.

Referring back to FIG. 2, the detector position map generated according to the above described methods can then be used during a PET scan by the event locator circuit 27 to map the (x, z) coordinate pairs generated by the acquisition circuits 25 to a crystal ID number.

While the foregoing specification illustrates and describes the preferred embodiments of this invention, it is to be understood that the invention is not limited to the precise construction disclosed herein. The invention can be embodied in other specific forms without departing from the spirit or essential attributes. Accordingly, reference should be made to the following claims, rather than to the foregoing specification, as indicating the scope of the invention.

What is claimed is:

1. A method of generating a detector position map for an array of detectors, the detector position map comprising a map which maps measured coordinates from a detection event to the detector in the array which detected the detection event, the method comprising the steps of:
   illuminating an array of detectors with a source of radiation to generate a histogram, the histogram comprising an event count as a function of two dimensions, the two dimensions corresponding to a face of the array of detectors, wherein the histogram comprises a plurality of first peaks;
   modifying the histogram to comprise a plurality of second peaks, wherein the second peaks have a greater degree of isolation from each other than the first peaks; and
   for each detector, determining a region on the detector position map which corresponds to the detector, each region being based on a position of one of the second peaks;
   wherein the step of modifying the histogram to comprise a plurality of second peaks comprises compressing the histogram by averaging adjacent pixels of the histogram; applying a low pass filter to the compressed histogram to produce a smoothed histogram; applying a Laplacian filter to the smoothed histogram to produce a Laplacian histogram; and modifying regions of the Laplacian histogram having values less than a threshold value to produce a thresholded histogram.

2. The method of claim 1, further comprising the step of eliminating a number of the second peaks in excess of the number of detectors in the array.

3. The method of claim 2, wherein the step of eliminating a number of second peaks in excess of the number of detectors in the array comprises the steps of:
   (a) determining the number of second peaks in excess of the number of detectors in the array;
   (b) identifying the pair of second peaks having the shortest distance between them;
   (c) determining which of the pair has a lower value;
   (d) deleting the lowest second peak in the pair; and
   (e) repeating steps (b), (c) and (d) until the number of remaining second peaks equals the number of detectors in the array.

4. The method of claim 1, further comprising the step of assigning each second peak to a detector.

5. The method of claim 4, wherein the step of assigning each second peak to a detector comprises the steps of:
   sorting the second peaks according to a first of two dimensions;
   sorting the second peaks according to a second of two dimensions; and
   matching each second peak to a detector.

6. The method of claim 1, wherein the step of determining a region on the detector position map comprises the step of determining a closest second peak for each coordinate pair.

7. The method of claim 1, further comprising the step of mapping an event having a coordinate pair to one of the detectors in the array based on the detector position map.

8. The method of claim 1, wherein the method is executed by a positron emission tomography scanner.

9. The method of claim 1, wherein the first peaks have a first average cross sectional area which is greater than a second average cross sectional area of the second peaks.

10. A method of generating a detector position map for an array of detectors, the detector position map comprising a map which maps measured coordinates from a detection event to the detector in the array which detected the detection event, the method comprising the steps of:
    illuminating an array of detectors with a source of radiation to generate a histogram, the histogram comprising an event count as a function of two dimensions, the two dimensions corresponding to a face of the array of detectors, wherein the histogram comprises a plurality of peaks;
    for each of the peaks, determining a pair of coordinates describing the position of the peak;
    sorting each of the peaks according to their coordinates such that each of the peaks is associated with one of the detectors; and
    for each detector, determining a region on the detector position map which corresponds to the detector;
    wherein a Lapacian filter is applied to the histogram to produce a Laplacian histogram and wherein regions of the Laplacian histogram are modified having values less than a threshold value to produce a thresholded histogram.

11. The method of claim 10, wherein the sorting step is carried out with a bubble sort routine.

12. A method of generating a detector position map for an array of detectors, the detector position map comprising a map which maps measured coordinates from a detection event to the detector in the array which detected the detection event, the method comprising the steps of:
    illuminating an array of detectors with a source of radiation to generate a histogram, the histogram comprising an event count as a function of two dimensions, the two dimensions corresponding to a face of the array of detectors;
    modifying the histogram to comprise a plurality of isolated peaks; and
    for each detector, determining a region on the detector position map which corresponds to the detector, each region being based on a position of one of the isolated peaks;
    wherein a Lapacian filter is applied to the histogram to produce a Laplacian histogram and wherein regions of the Laplacian histogram are modified having values less than a threshold value to produce a thresholded histogram.

13. A method of generating a detector position map for a positron emission tomography scanner, the method comprising the steps of:
    illuminating an array of detectors with a source of radiation to generate a histogram, the histogram comprising an event count as a function of two dimensions;
    applying a low pass filter to the histogram to produce a smoothed histogram;
    applying a Laplacian filter to the smoothed histogram to produce a Laplacian histogram;
    applying a threshold criterion to the Lapacian histogram to produce a thresholded histogram;

mapping peaks from the thresholded histogram to respective detectors in the array of detectors; and generating a detector position map based on locations of the peaks.

14. A system for generating a detector position map for an array of detectors, the detector position map comprising a map which maps measured coordinates from a detection event to the detector in the array which detected the detection event, the system comprising:

a memory; and a processor which:

receives a plurality of event data packets, each event data packet comprising a coordinate pair;

stores the plurality of event data packets in the form of a histogram in the memory, the histogram comprising an event count as a function of two dimensions, the two dimensions corresponding to a face of the array of detectors, wherein the histogram comprises a plurality of first peaks;

modifies the histogram to comprise a plurality of second peaks, wherein the second peaks have a greater degree of isolation from each other than the first peaks;

for each detector, determines a region on the detector position map which corresponds to the detector, each region being based on a position of one of the second peaks; and stores each region in the memory to create the detector position map.

15. A system for generating a detector position map for an array of detectors, the detector position map comprising a map which maps measured coordinates from a detection event to the detector in the array which detected the detection event, the system comprising:

a memory; and a processor which:

receives a plurality of event data packets, each event data packet comprising a coordinate pair;

stores the plurality of event data packets in the form of a histogram in the memory, the histogram comprising an event count as a function of two dimensions, the two dimensions corresponding to a face of the array of detectors, wherein the histogram comprises a plurality of first peaks, the plurality of first peaks having a first average cross section;

modifies the histogram to comprise a plurality of second peaks, wherein the second peaks have a second average cross section which is less than the first average cross section;

for each detector, determines a region on the detector position map which corresponds to the detector, each region being based on a position of one of the second peaks; and stores each region in the memory to create the detector position map.

16. The system of claim 15, wherein the detector position map is adapted to be used with a positron emission tomography scanner.

17. The system of claim 15, wherein the processor is further adapted to eliminate a number of the second peaks in excess of the number of detectors in the array.

* * * * *